United States Patent [19]
Brunelle

[11] Patent Number: 5,939,519
[45] Date of Patent: Aug. 17, 1999

[54] POLYESTERAMIDES OF HIGH CRYSTALLINITY AND REAGENTS FOR THEIR PREPARATION

[75] Inventor: Daniel Joseph Brunelle, Burnt Hills, N.Y.

[73] Assignee: General Electric Co., Schenectady, N.Y.

[21] Appl. No.: 09/075,914

[22] Filed: May 11, 1998

[51] Int. Cl.$^6$ .................................................. C08G 69/44
[52] U.S. Cl. ......................... 528/336; 528/170; 528/272; 528/274; 528/288; 528/310; 528/322; 528/332; 528/335
[58] Field of Search ..................... 528/272, 288, 528/274, 310, 322, 170, 332, 335, 336

[56] References Cited

U.S. PATENT DOCUMENTS 2,891,930  6/1959  Caldwell et al. ........................ 528/272
2,901,466  8/1959  Kibler et al. ............................. 525/425

OTHER PUBLICATIONS

"Nucleation of Polyethylene Terephthalate by Copolymerization", Bouma et al., Polym. Prep., 38, 486 (1997).
"Polyesters With Diamide Segments", Gaymans et al., Polym. Prep., 38, 402 (1997).
"Segmented Copolymers With Poly(Ester Amide) Units of Uniform Length: Synthesis", Gaymans et al., Polymer, 34, 4360 (1993).

*Primary Examiner*—P. Hampton-Hightower
*Attorney, Agent, or Firm*—Noreen C. Johnson; Douglas E. Stoner

[57] ABSTRACT

The crystallinity of poly(1,4-cyclohexanedimethyl 1,4-cyclohexanedicarboxylate) is enhanced by the incorporation of amide units, preferably derived from such compounds as 1,6-bis(4-carbomethoxycyclohexylcarboxamido)hexane. Crystallization temperatures increase, as do heats of crystallization.

10 Claims, No Drawings

POLYESTERAMIDES OF HIGH CRYSTALLINITY AND REAGENTS FOR THEIR PREPARATION

BACKGROUND OF THE INVENTION

This invention relates to polyesters, and more particularly to the modification of polyesters to enhance their crystallinity.

Poly(1,4-cyclohexanedimethyl 1,4-cyclohexanedicarboxylate), hereinafter sometimes designated "PCCD" for brevity, is a known polyester; reference is made, for example, to U.S. Pat. No. 2,891,930. It is characterized by such advantageous properties as crystallinity and resistance to weathering under conditions of exposure to ultraviolet radiation. These properties have increased interest in commercialization in recent years.

However, the crystallinity of PCCD is not as high as that of such commercially available polyesters as poly(1,4-butylene terephthalate), or "PBT". While the crystalline melting temperature, Tm, of PCCD is in the range of 225–235° C., a relatively high figure, its temperature of crystallization, Tc, is on the order of 152–171° C. Therefore, its solvent resistance is not as high as might be desired. There is interest in increasing the crystallinity of PCCD, and concomitantly increasing its Tc.

Various researchers have reported increases in the Tc of other polyesters as a result of incorporating amide segments therein. For example, Bouma et al., *Polym. Prep.*, 38, 486 (1997), reports previous work by Van Bennekom demonstrating such a phenomenon as a result of the incorporation in PBT or poly(ethylene terephthalate) of ethyleneterephthalamide or 1,4-butyleneterephthalamide units. Further work has shown that increased crystallinity generally has two requirements: a very uniform copolymer (i.e., one in which the amide units are fairly evenly spaced as opposed to being present in blocks) and the presence of alkylene groups separating the nitrogen atoms which have the same molecular structure as the alkylene groups of the polyester. It was also found that side reactions, including methylation of the diamine corresponding to the amide units, occurred in significant amount during preparation of the amide functionality from a diamine. This was particularly true of the one-pot reaction in which tetramethylenediamine first underwent reaction with dimethyl terephthalate and 1,4-butanediol was subsequently added.

U.S. Pat. No. 2,901,466 discloses the preparation of polyesteramides comprising PCCD units in combination with, for example, 1,6-hexyleneterephthalamide units, the latter being present in proportions on the order of 20 mole percent of the polyesteramide. There is no suggestion, however, of an increase in crystallinity as a result of the presence of amide units.

SUMMARY OF THE INVENTION

The present invention is based on the discovery that polyesteramides derived from PCCD and having increased crystallinity as compared to the corresponding polyester may be prepared by incorporating alkylene-1,4-cyclohexanedicarboxamide and especially 1,6-hexylene-1,4-cyclohexanedicarboxamide units therein. This is surprising, since the alkylene groups in the amide units are not the 1,4-cyclohexanedimethylene groups present in the ester units.

In one of its aspects, the invention includes cyclohexylene polyesteramides comprising structural units of the formulas

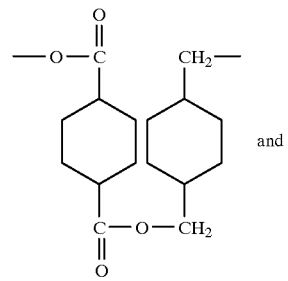

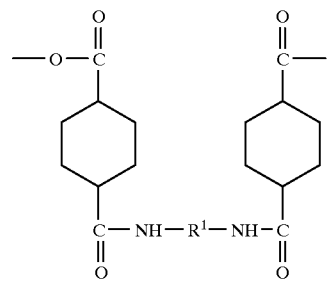

wherein $R^1$ is $C_{2-10}$ alkylene, said units of formula II being present in an amount effective to afford a polyesteramide having a temperature of crystallization of at least 165° C. and at least 9° C. higher than that of a corresponding homopolyester having the same distribution of cis and trans isomers.

Another aspect of the invention is bisesteramides capable of reaction to form said polyesteramides. They are cyclohexylenebisesteramides of the formula

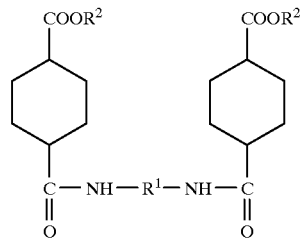

wherein $R^1$ is as previously defined and each $R^2$ is hydrogen or $C_{1-6}$ alkyl.

DETAILED DESCRIPTION; PREFERRED EMBODIMENTS

The structural units of formula I in the polyesteramides of the invention are PCCD units. Those of formula II are amide units whose presence is responsible for the increase in Tc compared to that in PCCD homopolyester. Said amide units are typically present in minor proportion, preferably up to about 20, more preferably in the range of about 0.5–18.0 and most preferably about 0.5–10.0 mole percent based on total ester and amide units.

The $R^1$ radical may be any $C_{2-10}$ alkylene radical. It is preferably a linear radical and especially one containing 4–8 carbon atoms. The hexamethylene radical is most preferred, since the resulting amide units apparently have a molecular conformation similar to that of the atoms in the 1,4- cyclohexanedimethylene radical. Thus, the molecular configuration of said radical makes such units behave as though the 1,4-cyclohexanedimethylene radical were present.

The $R^2$ radicals are each hydrogen or $C_{1-6}$ alkyl. They are preferably methyl.

The polyesteramides of this invention may be prepared by at least two methods. The first is the reaction of a combination of 1,4-cyclohexanedimethanol (hereinafter sometimes "CHDM") and an amine corresponding to the amide moiety in formula II with 1,4-cyclohexanedicarboxylic acid or a functional derivative thereof. Most often, a dialkyl ester of the acid is used as a derivative, with the dimethyl ester (hereinafter sometimes "DMCD") being preferred by reason of its ease of preparation and relatively low cost.

In this first method, it is possible to prepare a blend of CHDM, the diamine and DMCD in the desired proportions. Subsequently, a suitable catalyst such as a tetraalkyl titanate is added and the reaction mixture heated at a temperature in the range of about 120–200° C. to effect transesterification with formation of a polyesteramide oligomer. Alternatively, the diamine and DMCD may undergo an initial amide-forming reaction, after which catalyst and CHDM are added and the transesterification reaction conducted. In either case, a final molecular weight-building polymerization reaction under melt or solid state conditions is typically carried out under conventional conditions.

DMCD and CHDM exist in cis and trans isomeric forms. The polyesteramides of the invention preferably have high proportions of units with trans configuration, especially in the acid moieties. In general, melting and crystallization temperatures increase with the proportion of totally trans-configured units of formula I. Said proportion is usually in the amount of about 90–95 mole percent, though trans percentages of 100% can be obtained from highly purified monomers.

The second method for preparing the polyesteramides includes a first step of preparing a bisesteramide of formula III, as illustrated by 1,6-bis(4-carbomethoxycyclohexylcarboxamido)hexane. Such bisesteramides are believed to be novel compounds and they constitute the second aspect of the invention. A reaction is then carried out involving the bisesteramide, CHDM and DMCD in proportions effective to produce a polyesteramide having the desired proportions of structural units.

The intermediate bisesteramides of the invention may be prepared by the reaction of 1,4-cyclohexanedicarboxylic acid or a functional derivative thereof, preferably a dialkyl ester, with a diamine of the formula $H_2N$—$R^1$—$NH_2$, the former being present in excess. A typical molar ratio of acid to diamine is in the range of about 3–6:1. The reaction may be conducted at temperatures in the range of about 150–200° C., neat or in solution in a solvent such as toluene, xylene, chlorobenzene, o-dichlorobenzene or anisole. The product may be isolated and purified by conventional means such as separation as a solid followed by recrystallization.

Irrespective of the method of preparation of the polyesteramide, it is conventional to employ DMCD in a slight excess, usually about 0.2–1.0 mole percent based on total of CHDM and diamine. Catalyst is typically present in the amount of about 0.05–0.5 mole percent based on DMCD.

As previously mentioned, PCCD homopolyester ordinarily has a Tm on the order of 225–235° C. and a Tc on the order of 152–171° C. The absolute values of these parameters are uniformly higher for polymers prepared from all-trans monomers than those prepared from cis-trans monomer mixtures. The polyesteramides of the present invention typically have Tm values in the range of about 220–240° C., not substantially different from that of PCCD. However, the Tc values of said polyesteramides are at least 165° C. and are often in the range of about 180–190° C., being in each instance at least 9° C. higher than those of the corresponding homopolyester having the same cis-trans distribution. Thus, the presence of amide units leads to a substantially higher degree of crystallinity, which can be expected to improve such properties as resistance to the effects of heat and solvents.

The invention is illustrated by the following examples. Polymer molecular weights were determined from intrinsic viscosity in a mixture of phenol and tetrachloroethane.

EXAMPLE 1

A mixture of 4.0 g (20 mmol) of DMCD and 1.0 ml of a 4.0 M solution of hexamethylenediamine in toluene (4 mmol) was heated at 160° C. in a nitrogen atmosphere, with stirring. After 1.5 hours, the entire reaction mixture was solid and no amine was detected by vapor phase chromatographic analysis. The solid was triturated with ethyl acetate, separated by filtration and dried in vacuum, yielding 1.28 g of the desired 1,6-bis(4-carbomethoxycyclohexylcarboxamido)hexane having a melting point of 240° C. Analysis by gel permeation chromatography showed the presence of about 75% (by weight) monomer and 25% dimer.

EXAMPLE 2

A mixture of 20 g (100 mmol) of DMCD and 5.0 ml of a 4.0 M solution of hexamethylenediamine in toluene (5 mmol) was heated for 16 hours under reflux in 20 ml of xylene in a nitrogen atmosphere, with stirring. The reaction mixture was diluted with ethyl acetate, filtered and worked up as in Example 1, yielding the desired 1,6-bis(4-carbomethoxycyclohexylcarboxamido)hexane in 96% yield. Analytical results were similar to those in Example 1. Similar results were obtained using anisole as solvent and refluxing for 5 hours.

EXAMPLES 3–5

A number of 100-ml round-bottomed 3-necked flasks fitted with stirrers, elastomeric septa, thermometers and distillation apparati were charged with 19.6 g (98 mmol) of DMCD (95% trans isomer), 14.4 g (100 mmol) of CHDM (cis-trans mixture) and various proportions of hexamethylenebis(4-carbomethoxycyclohexylcarboxamide). The mixtures were blanketed with nitrogen and heated at 170° C. in an oil bath, with stirring, until homogeneous. Tetraisopropyl titanate, 35 μl, was added by injection, whereupon methanol began collecting in the distillation vessel. The temperature was increased to 230° C. over 15 minutes, and heating was continued for 20 minutes whereupon methanol evolution ceased. The reaction flask was evacuated carefully, so as not to strip off remaining monomer, and heating was continued until material began to solidify on the stirrer shaft.

The hot product was dissolved in chloroform, precipitated into methanol and vacuum filtered. The filter cake was dried overnight in a vacuum oven. A 10-g sample thereof was subjected to solid state polymerization at 200–205° C., and the products were analyzed for trans isomer, weight and number average molecular weight, Tm, Tc and heat of crystallization crystallization (ΔH).

EXAMPLES 6–9

The procedure of Examples 3–5 was repeated, using 100% trans DMCD.

The results of Examples 3–9 are listed in Table I, in comparison with two PCCD homopolyesters as controls.

TABLE I

| Example | Bisamide, % | Trans, % | Mw | Tm, °C. | Tc, °C. | ΔH, J/g |
|---|---|---|---|---|---|---|
| Control 1 | 0 | 93 | 69,800 | 225 | 153 | −23 |
| 3 | 0.5 | 95.5 | 83,400 | 230 | 186 | −33 |
| 4 | 1.0 | 96.6 | 89,100 | 229 | 181 | −29 |
| 5 | 5.0 | 97.2 | 84,700 | 224 | 178 | −26 |
| Control 2 | 0 | 100 | 82,400 | 230 | 171 | −28 |
| 6 | 0.5 | 100 | 83,000 | 231 | 180 | −28 |
| 7 | 1.0 | 100 | 81,300 | 230 | 182 | −28 |
| 8 | 2.5 | 100 | 75,000 | 235 | 190 | −30 |
| 9 | 5.0 | 100 | 85,500 | 230 | 185 | −27 |

It is apparent that the copolyesteramides of the invention have Tc values substantially higher than those of the controls, with the minimum difference being 9° C. between the product of Example 6 and Control 2. By contrast, the Tm values did not vary as much.

EXAMPLE 10

A mixture of 20.123 g (100.5 mmol) of DMCD (95% trans isomer) and 0.5 ml of a 4.0 M solution of hexamethylenediamine in toluene (2 mmol) was heated for 1.5 hours at 160° C. under nitrogen, with stiring, after which 14.135 g (98 mmol) of CHDM and 30 μl of tetraisopropyl titanate were added. The mixture was heated at 170° C. for 2 hours with distillation of methanol, and then at 230° C. for 30 minutes. Vacuum was applied gradually, whereupon the polymeric product pulled away from the walls of the reaction flask. The polyesteramide was worked up and subjected to solid state polymerization as in Examples 3–5, yielding a product with a weight average molecular weight of 89,200, a Tm of 228° C., a Tc of 187° C. and a heat of crystallization of −26.3 J/g.

EXAMPLE 11

The procedure of Example 10 was repeated, using 5 mmol of hexamethylenediamine. The product copolyesteramide had a weight average molecular weight of 77,000, a Tm of 230° C., a Tc of 177° C. and a heat of crystallization of −33.4 J/g.

EXAMPLE 12

A mixture of 29.884 g (149.25 mmol) of DMCD (95% trans isomer), 21.63 g (150 mmol) of CHDM and 0.375 ml of a 4 M solution of hexamethylenediamine in toluene (1.5 mmol) was heated for 2 hours at 160° C. under nitrogen, with stirring. Tetraisopropyl titanate, 52 μl, was added and the polymerization was conducted as described in Example 10. Upon solid state polymerization, the product copolyesteramide had a weight average molecular weight of 85,100, a Tm of 227° C., a Tc of 185° C. and a heat of crystallization of −28.3 J/g.

What is claimed is:

1. A cyclohexylene polyesteramide comprising structural units of the formulas

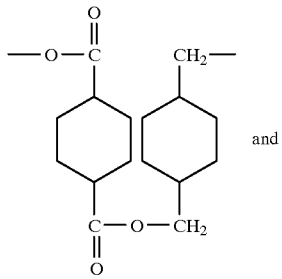

(I)

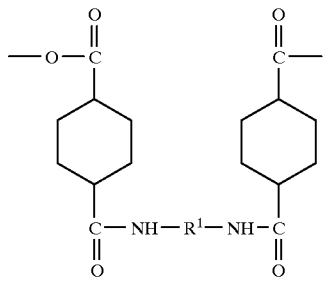

(II)

wherein $R^1$ is $C_{2-10}$ alkylene, said units of formula II being present in proportions of up to about 18 mole percent based on total ester and amide units, whereby said polyesteramide has a temperature of crystallization of at least 165° C. and at least 9° C. higher than that of a corresponding homopolyester having the same distribution of cis and trans isomers.

2. A cyclohexylene polyesteramide according to claim 1 wherein $R^1$ contains 4–8 carbon atoms.

3. A cyclohexylene polyesteramide according to claim 2 wherein $R^1$ is hexamethylene.

4. A cyclohexylene polyesteramide according to claim 1 wherein said units of formula II are present in a proportion in the range of about 0.5–10.0 mole percent based on total ester and amide units.

5. A cyclohexylene polyesteramide according to claim 1 wherein the proportion of trans-configured units of formula I is in the range of about 90–95 mole percent.

6. A cyclohexylene polyesteramide according to claim 1 wherein the proportion of trans-configured units of formula I is 100 mole percent.

7. A cyclohexylenebisesteramide of the formula

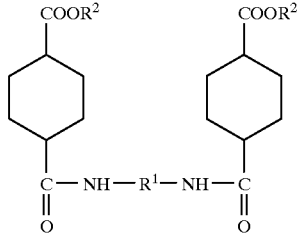

(III)

wherein $R^1$ is $C_{2-10}$ alkylene and each $R^2$ is $C_{1-6}$ alkyl.

8. A cyclohexylenebisesteramide according to claim 7 wherein $R^1$ contains 4–8 carbon atoms.

9. A cyclohexylenebisesteramide according to claim 8 wherein $R^1$ is hexamethylene.

10. A cyclohexylenebisesteramide according to claim 8 wherein $R^2$ is a methyl.

* * * * *